(12) United States Patent
Yoda et al.

(10) Patent No.: US 9,944,550 B2
(45) Date of Patent: Apr. 17, 2018

(54) TEMPERED GLASS PLATE

(71) Applicant: ASAHI GLASS COMPANY, LIMITED, Tokyo (JP)

(72) Inventors: Kazushige Yoda, Tokyo (JP); Masao Fukami, Tokyo (JP); Shinya Ohta, Tokyo (JP); Yasumasa Kato, Tokyo (JP); Shigeru Ezaki, Kawasaki (JP)

(73) Assignee: ASAHI GLASS COMPANY, LIMITED, Tokyo (JP)

( * ) Notice: Subject to any disclaimer, the term of this patent is extended or adjusted under 35 U.S.C. 154(b) by 15 days.

(21) Appl. No.: 15/213,916

(22) Filed: Jul. 19, 2016

(65) Prior Publication Data
US 2017/0022089 A1    Jan. 26, 2017

(30) Foreign Application Priority Data

Jul. 24, 2015    (JP) ................. 2015-147114

(51) Int. Cl.
| | | |
|---|---|---|
| *C03B 27/02* | (2006.01) | |
| *C03C 3/087* | (2006.01) | |
| *C03C 3/078* | (2006.01) | |
| *C03B 27/04* | (2006.01) | |
| *C03B 27/052* | (2006.01) | |
| *C03C 23/00* | (2006.01) | |

(52) U.S. Cl.
CPC .......... *C03C 3/087* (2013.01); *C03B 27/0413* (2013.01); *C03B 27/052* (2013.01); *C03B 27/0522* (2013.01); *C03B 27/0526* (2013.01); *C03C 3/078* (2013.01); *C03C 23/007* (2013.01)

(58) Field of Classification Search
CPC .................................. C03B 27/0413
See application file for complete search history.

(56) References Cited

U.S. PATENT DOCUMENTS

| 3,125,430 A | * | 3/1964 | Richardson | ......... C03B 27/0404 65/114 |
|---|---|---|---|---|
| 4,128,690 A | | 12/1978 | Boardman et al. | |
| 4,178,414 A | * | 12/1979 | Greenhalgh | ........ C03B 27/0404 428/410 |

(Continued)

FOREIGN PATENT DOCUMENTS

| EP | 1254866 A1 | * | 11/2002 | ......... C03B 27/0404 |
|---|---|---|---|---|
| GB | 1217229 A | * | 12/1970 | ......... C03B 27/0404 |

(Continued)

*Primary Examiner* — David Sample
(74) *Attorney, Agent, or Firm* — Foley & Lardner LLP (57) ABSTRACT

There is provided a tempered glass plate, wherein a thickness of the tempered glass plate is less than or equal to 2.7 mm, wherein on a surface of the tempered glass plate, a plurality of stress marks are formed, wherein a distance between closest stress marks of the plurality of stress marks is less than or equal to 20 mm, wherein the surface of the tempered glass plate includes a first virtual circle that is formed by connecting points that are separated from a center of one of the plurality of stress marks by 2.5 mm, wherein the tempered glass plate includes a non elastic-wave region that is not affected by an elastic-wave generated during fracturing, and wherein, in the non elastic-wave region, an average number of cracks that exist in the first virtual circle is greater than or equal to 3.4.

30 Claims, 6 Drawing Sheets

(56) References Cited

U.S. PATENT DOCUMENTS

| | | | | |
|---|---|---|---|---|
| 4,182,619 A | * | 1/1980 | Greenhalgh | C03B 27/0404 65/104 |
| 2002/0194872 A1 | * | 12/2002 | Kato | C03B 9/41 65/29.11 |
| 2004/0007022 A1 | * | 1/2004 | Tominaga | C03B 27/0404 65/114 |
| 2017/0001899 A1 | * | 1/2017 | Kato | C03B 27/0526 |

FOREIGN PATENT DOCUMENTS

| JP | S52-121620 A | 10/1977 |
|---|---|---|
| JP | S59-019050 A | 1/1984 |

* cited by examiner

TEMPERED GLASS PLATE

CROSS-REFERENCE TO RELATED APPLICATION

The present application is based on and claims the benefit of priority of Japanese Priority Application No. 2015-147114 filed on Jul. 24, 2015, the entire contents of which are hereby incorporated herein by reference.

BACKGROUND OF THE INVENTION

1. Field of the Invention

The present invention relates to a tempered glass plate, and especially, to a tempered glass plate with a thin plate thickness adapted for weight reduction of a vehicle in recent years.

2. Description of the Related Art

As for a window glass of a vehicle, a tempered glass plate has been used, so far. The tempered glass plate includes a compressive stress layer formed on the surface of the tempered glass plate; and a tensile stress layer at a middle portion in the thickness direction of the tempered glass plate. The tempered glass plate can be produced by applying a strengthening process to the surface of the glass plate in a high temperature state, for example, from 650° C. to 700° C. by blowing the air.

In recent years, to achieve weight reduction of a vehicle from a view point of fuel saving, there is a demand for a glass plate with a thin plate thickness that satisfies a safety standard required for the tempered glass for the vehicle.

Patent Document 1 and Patent Document 2 disclose a tempered glass plate, which is a glass plate with a thin plate thickness, and which satisfies the safety standard required for the tempered glass plate for the vehicle.

Patent Document

[Patent Document 1] Japanese Unexamined Patent Publication No. S59-19050
[Patent Document 2] Japanese Unexamined Patent Publication No. S52-121620

SUMMARY OF THE INVENTION

For a case of applying the disclosures of Patent Document 1 and Patent Document 2 to a glass plate with a thin plate thickness, for example, to a glass plate with a thickness of less than or equal to 2.7 mm, an elongated fragment (spline) with a length that exceeds 75 mm and a large fragment with an area that exceeds 3 $cm^2$ tend to be generated, so that the safety standard may not be stably satisfied.

There is a need for a tempered glass plate that can easily satisfy a fragmentation standard for a vehicle window glass, and that has a thin plate thickness.

According to an aspect of the present invention, there is provided a tempered glass plate that is tempered by cooling medium jetted from a plurality of nozzles, wherein a thickness of the tempered glass plate is less than or equal to 2.7 mm, wherein on a surface of the tempered glass plate, a plurality of stress marks are formed by the cooling medium jetted from the plurality of nozzles, wherein a distance between closest stress marks of the plurality of stress marks is less than or equal to 20 mm, wherein the surface of the tempered glass plate includes a first virtual circle that is formed by connecting points that are separated from a center of one of the plurality of stress marks by 2.5 mm, wherein the tempered glass plate includes a non elastic-wave region that is not affected by an elastic-wave that is generated during fracturing, and wherein, during the fracturing, in the non elastic-wave region, an average number of cracks that exist in the first virtual circle is greater than or equal to 3.4.

According to the present invention, a tempered glass plate is provided, which can easily satisfy a fragmentation standard for a vehicle window glass, and which has a thin plate thickness.

BRIEF DESCRIPTION OF THE DRAWINGS

Other objects, features and advantages of the present invention will become more apparent from the following detailed description when read in conjunction with the accompanying drawings.

DETAILED DESCRIPTION OF THE PREFERRED EMBODIMENTS

A tempered glass plate according to an embodiment of the present invention is described below by referring to the accompanying drawings.

In the present specification, the tempered glass plate G is described that has a rectangular shape in plane view; however the shape of the tempered glass plate G is not limited to this. For example, the tempered glass plate G may have a polygonal shape, such as a trapezoidal shape or a triangular shape; and one edge and/or a corner portion of the polygonal shape may have an arch shape.

Note that, in the following part of the present specification, "parallel" allows a deviation to the extent that the effect of the present invention is not damaged. For example, a deviation to the extent of ±3 degrees from "parallel" in the strict sense is allowed.

Figure 1:
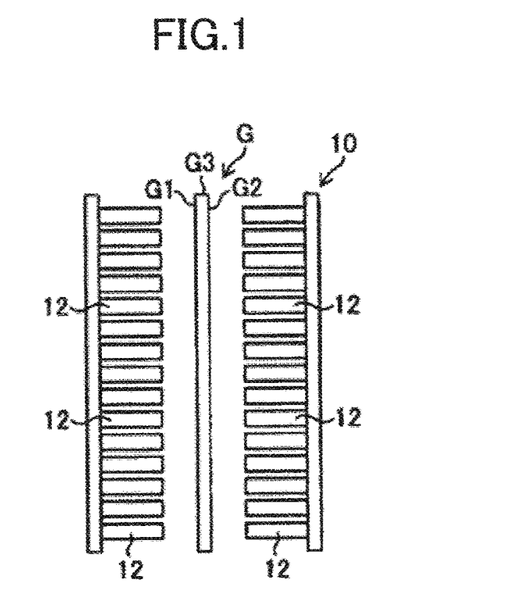
FIG. 1 is a schematic diagram exemplifying major components of a thermally strengthening device for manufacturing a tempered glass plate according to an embodiment.
Figure 2:
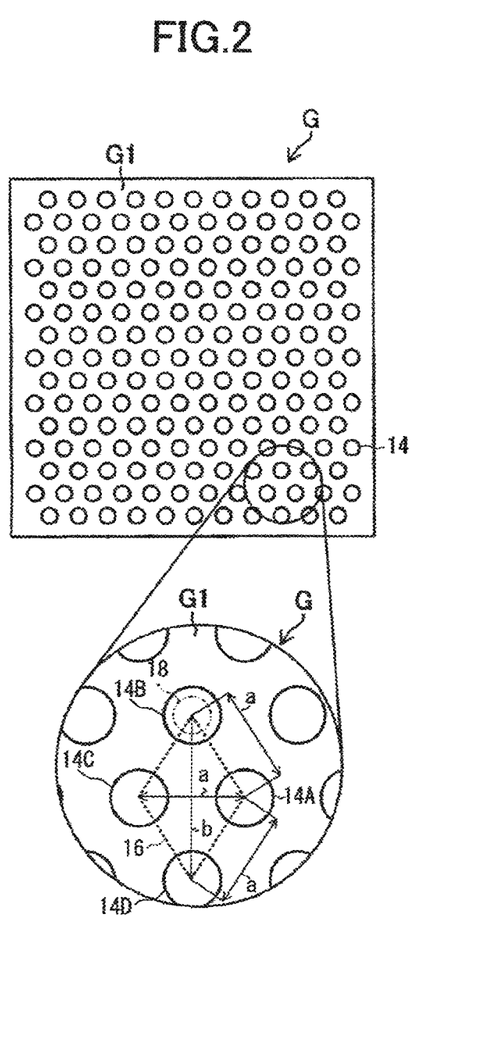
FIG. 2 is a front view of the tempered glass plate G, which is tempered by the thermally strengthening device.
Figure 3:
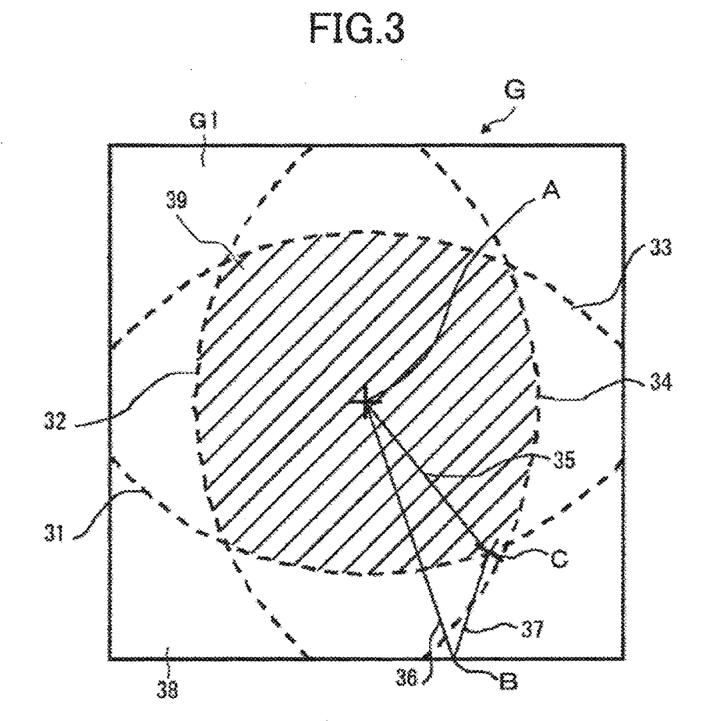
FIG. 3 is a conceptual diagram illustrating an elastic-wave region and a non elastic-wave region.

FIG. 1 is a schematic diagram exemplifying major components of a thermally strengthening device 10 for producing a tempered glass plate according to the embodiment. FIG. 2 is a front view of the tempered glass plate G, which is tempered by the thermally strengthening device 10. FIG. 3 is a conceptual diagram illustrating an elastic-wave region and a non elastic-wave region.

The tempered glass plate G is tempered by the thermally strengthening device 10. The tempered glass plate G includes a first surface G1; a second surface G2 facing the first surface G1; and a lateral surface G3 connecting the first surface G1 and the second surface G2.

The thickness of the tempered glass plate G is greater than or equal to 1.8 mm and less than or equal to 2.7 mm. In particular, from a viewpoint of weight reduction of a vehicle, the thickness of the tempered glass plate G is preferably less than or equal to 2.5 mm, and more preferably less than or equal to 2.3 mm. Further, if the plate thickness is greater than or equal to 1.8 mm, in a thermally strengthening method, a surface compressive stress that satisfies a fragmentation standard, and an internal tensile stress that occurs, while paired with the surface compressive stress, tend to be formed.

The thermally strengthening device 10 includes a plurality of nozzles 12 for jetting cooling medium toward the entire regions of the first surface G1 and the second surface G2. The air can be considered as an example of the cooling medium. In the nozzles 12, a plurality of nozzles is symmetrically arranged (staggered arrangement).

Here, the arrangement of the plurality of nozzles is not limited to the staggered arrangement; and the plurality of nozzles may be arranged, for example, in a square lattice manner.

The cooling medium from the nozzles 12 is jetted onto the surface of the tempered glass plate G, which is tempered by the thermally strengthening device 10. By doing this, stress marks 14 are formed, as illustrated in FIG. 2. On the surface of the tempered glass plate G, the stress marks 14 are formed immediately below the respective nozzles 12; namely, the stress marks 14 are formed at the positions corresponding to the portions having higher quenching capability. Such positions tend to be more quenched, compared to other portions. Thus, if these portions are viewed in a plan view, a strong plane compressive stress is generated. Accordingly, the stress marks 14 can be observed by a polarizing plate or a sensitive color plate. In FIG. 2, the stress marks 14 are depicted by circles; however, the shapes of the stress marks 14 are not limited to the circles. The shapes of the stress marks 14 may be various shapes, such as elliptical shapes, a rectangular shape, and a polygonal shape; or the shapes of the stress marks 14 may be spotted shapes.

As described above, the stress marks 14 are formed at the positions that are immediately below the nozzles 12. Consequently, the stress marks 14 are symmetrically arranged (staggered arrangement), similar to the nozzles 12. As illustrated in FIG. 2, the stress marks 14 include a first stress mark 14A; a second stress mark 14B; a third stress mark 14C; and a fourth stress mark 14D.

The second stress mark 14B, the third stress mark 14C, and the fourth stress mark 14D are arranged to be separated from the first stress mark 14A by a reference distance "a." Namely, when the first stress mark 14A is viewed as the center, the reference distance "a" is a distance between the first stress mark 14A and the stress marks that are closest to the first stress mark 14A. The distance between the stress marks indicates a distance between a center of a specific stress mark and a center of another stress mark that is closest to the specific stress mark. There may be more than one of the stress marks having the same distance between the stress marks. For the case of this embodiment, for the first stress mark 14, there are six stress marks having the same distance between the stress marks.

Note that, for a case of the staggered arrangement as in this embodiment, the reference distance "a" is equal to a length of a short axis of the parallelogram, which is described below.

It is desirable that the reference distance "a" is less than or equal to 20 mm, more preferably less than or equal to 18 mm, further more preferably less than or equal to 16 mm, further more preferably less than or equal to 14 mm, further more preferably less than or equal to 13.5 mm, further more preferably less than or equal to 12 mm, and further more preferably less than 10 mm.

By setting such a reference distance "a," the stress marks 14 are formed with a small pitch. At an inner side of the stress mark 14 in the plate thickness direction, a high internal tensile stress is generated, which is an energy source for extending and branching a crack. Thus, if the pitch of the stress marks 14 is small, and the stress marks 14 are densely formed, the energy sources for extending and branching cracks are concentrated. Consequently, upon being fractured, an elongated fragment with a length that exceeds 75 mm and/or a large fragment with an area that exceeds 3 cm² can be prevented from being generated.

In general, in the tempered glass plate, in the areas where the stress marks 14 are formed, a plane compressive stress is generated; and in the areas between the stress marks 14, a plane tensile stress is generated. If, at a boundary portion, a difference between the plane compressive stress and the plane tensile stress becomes too large, a significant optical distortion is generated in the tempered glass plate at the boundary portion. That has been a cause of discomfort to a drive of a vehicle, such as a distortion of a scene. Thus, so far, during thermal strengthening, after forming a pattern on the tempered glass plate by the plane compressive stress and the plane tensile stress, the pattern is dulled by oscillating the glass plate, namely, the boundary portion between the plane compressive stress and the plane tensile stress is dulled.

Whereas, the inventors of the present invention have found that, if the reference distance "a" is set to be less than or equal to a specific constant value, as it is in the embodiment, a driver of a vehicle tends not to recognize the boundary portion as a significant optical distortion. The reason is that, if the gap between the stress marks 14 is narrowed, even if a large difference is generated at a boundary portion between the plane compressive stress and the plane tensile stress, the pitch with which the boundary portions are repeatedly formed is also small, so that the driver tends not to recognize the boundary portions as a significant optical distortion. Consequently, it is not necessary to dull the boundary portions between the plane compressive stress and the plane tensile stress, and the oscillating distance can be reduced. Alternatively, oscillating may not be performed.

Especially, for a case where the tempered glass plate G includes a complex shaped surface, a distance between a tip of the nozzle 12 and the glass plate G and the oscillating distance of the glass plate G are limited, so as to prevent the tip of the nozzle 12 and the glass plate G from making contact during oscillating. Thus, it has been difficult to provide a tempered glass plate that can easily satisfy the fragmentation standard for the vehicle window glass, and that has a thin plate thickness. In contrast, with the above-described reference distance "a," the oscillating distance can be reduced, so that, even if the tempered glass includes a complex shaped surface, the glass plate with sufficient quality can be obtained.

Note that, in the present specification, a complex shaped surface refers to a surface that is curved in two directions, which are a specific direction and a direction perpendicular to the specific direction.

Here, for the reference distance "a," a deviation is allowed to the extent that the effect is not damaged. For example, a deviation to the extent of ±1 mm is allowed.

Note that the embodiment is not limited to the case where no oscillating is performed at all. As described below, for example, oscillating is allowed to the extent that the oscillating distance is less than or equal to approximately 25 mm.

Additionally, on the surface of the tempered glass plate G, a parallelogram area 16 is formed by the first stress mark 14A, the second stress mark 14B, the third stress mark 14C, and the fourth stress mark 14D. The parallelogram area 16 is formed by connecting centers of the first stress mark 14A, the second stress mark 14B, the third stress mark 14C, and the fourth stress mark 14D; and the parallelogram area 16 is, in FIG. 2, the area that is surrounded by the dashed line. The length of one edge of the parallelogram area 16 is the reference distance "a," the length of the short axis of the parallelogram area 16 is the reference distance "a," and the length of the long axis of the parallelogram area 16 is geometrically obtained from the reference distance "a."

The surface of the tempered glass G includes a compressive stress layer, and an inner portion of the tempered glass G in the plate thickness direction includes a tensile stress layer. By providing a localized impact on the tempered glass plate, cracks are generated on the surface. Upon the cracks reaching the tensile stress layer after passing through the compressive stress layer, the cracks extend in various directions of the glass plate by the tensile stress, and the tempered glass plate G is fractured. At that time, an elastic-wave is generated, and the elastic-wave propagates inside the tempered glass plate G toward a peripheral edge of the tempered glass plate G.

The elastic-wave is generated at a time that is the same as the time at which the cracks reach the tensile stress layer and start extending in various directions of the glass plate; and the elastic-wave propagates from the fracture origin (i.e., the starting point of the cracks) in a concentric manner. The propagation speed of the elastic-wave is faster than the extending speed of the cracks; and, in general, the propagation speed of the elastic-wave is from 1.1 times the extending speed of the cracks to 2.3 times the extending speed of the cracks.

After the elastic-wave is reflected at the peripheral edge of the tempered glass plate G, the elastic-wave impinges with a tip of the crack, which is extended later. Upon the tip of the crack and the elastic-wave colliding with each other, an energy fluctuation occurs, so that the cracks tend to be branched. As a result, a size of a fragment is smaller in a region (which is referred to as an "elastic-wave region 38," hereinafter) that is more separated, compared to the point where the elastic-wave and the crack impinge with each other, from the starting point of the crack, relative to a size of a fragment in a region (which is referred to as a "non elastic-wave region 39," hereinafter) closer to the starting point of the crack, compared to the point where the elastic-wave and the crack impinge with each other. Thus, fracturing inside the non elastic-wave region 39 is important to determine as to whether the tempered glass plate G satisfies the fragmentation standard for the vehicle window glass.

Assuming that the tempered glass plate G is fractured at the centroid A, and that the propagation speed of the elastic-wave is twice the extending speed of the crack, the elastic-wave region 38 and the non elastic-wave region 39 are described below by referring to FIG. 3.

In FIG. 3, when the tempered glass plate G is fractured at the centroid A, as the starting point, after propagating along the straight line 36 that extends from the centroid A to a point B on the lower edge portion of the tempered glass plate G, the elastic-wave is regularly reflected at the point B, and the elastic-wave propagates along the straight line 37. Consequently, the crack that extends from the centroid A, as the starting point, along the straight line 35 toward the lower edge of the tempered glass plate G impinges, at a point C, with the elastic-wave that propagates along the straight line 37.

The dashed line 31 is a line that is obtained by connecting the points at which the elastic-wave that is regularly reflected at the lower edge of the tempered glass plate G impinges with the crack that extends from the centroid A, as the starting point, toward the lower edge. Similarly, the dashed line 32 is a line that is obtained by connecting the points at which the elastic-wave that is regularly reflected at the left edge of the tempered glass plate G impinges with the crack that extends from the centroid A, as the starting point, toward the left edge; the dashed line 33 is a line that is obtained by connecting the points at which the elastic-wave that is regularly reflected at the upper edge of the tempered glass plate G impinges with the crack that extends from the centroid A, as the starting point, toward the upper edge; and the dashed line 34 is a line that is obtained by connecting the points at which the elastic-wave that is regularly reflected at the right edge of the tempered glass plate G impinges with the crack that extends from the centroid A, as the starting point, toward the right edge.

As described above, the region (hatched portion) closed by the dashed lines 31, 32, 33, and 34 is the non elastic-wave region 39; and the region other than the non elastic-wave region 39 is the elastic-wave region 38.

Here, the non elastic-wave region 39 may be varied, depending on the propagation speed of the elastic-wave. For example, the non elastic-wave region 39 may be a region with a width corresponding to a distance between the line obtained by connecting, while assuming that the propagation speed of the elastic-wave is 1.7 times the extending speed of the crack, the points at which the elastic-wave that is regularly reflected at the peripheral edge of the tempered glass plate G impinges with the crack that extends from the centroid A and the line obtained by connecting, while assuming that the propagation speed of the elastic-wave is 2.3 times the extending speed of the crack, the points at which the elastic-wave that is regularly reflected at the peripheral edge of the tempered glass plate G impinges with the crack that extends from the centroid A.

During fracturing of the tempered glass plate G, in the non elastic-wave region 39, an average number of cracks that exist within a first virtual circle 18 obtained by connecting the points that are separated from the center of the stress mark 14 by 2.5 mm is preferably greater than or equal to 3.4; more preferably greater than or equal to 4; and further more preferably greater than or equal to 4.2.

The center of the stress mark 14 implies the center of the stress mark 14 that is observed by a polarizing plate or a sensitive color plate.

The first virtual circle 18 is a circle with a radius of 2.5 mm, and the first virtual circle 18 is virtually formed on the surface of the tempered glass plate G. In FIG. 2, the first virtual circle 18 is depicted, so that the size of the first virtual circle 18 is smaller than the size of the stress mark 14; however, the size of the first virtual circle 18 may be the same as the size of the stress mark 14, or the size of the first virtual circle 18 may be smaller than the size of the stress mark 14.

Figure 4:
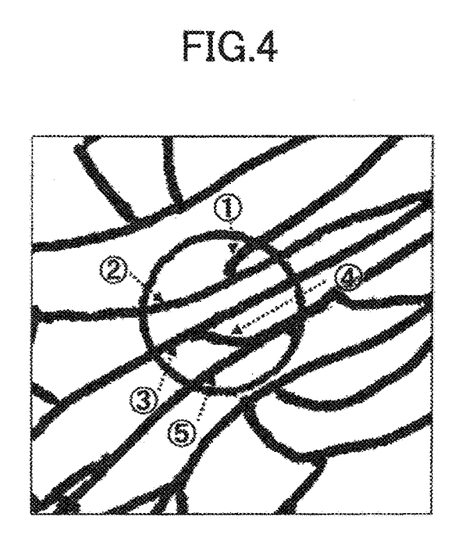
FIG. 4 is a diagram illustrating an example of a method of counting a number of cracks that exist in a first virtual circle.

FIG. 4 is a diagram illustrating an example of a method of counting the number of the cracks that exist within the first virtual circle 18. The number of the cracks that exist within the first virtual circle 18 indicates the number of the cracks that are counted, without distinguishing cracks that mainly extend (which are referred to as "main cracks," hereinafter) from cracks that branch at the branching point, as illustrated in FIG. 4. Here, the main crack represents a crack such that the angle of the crack almost does not change prior to and after the branching point.

Further, the average of the number of the cracks that exist within the first virtual circle 18 indicates an average value of numbers of cracks that exist within the first virtual circles, respectively, which correspond to all the stress marks 14 in the non elastic-wave region 39. Note that, for a case where the number of the first virtual circles in the non elastic-wave region 39 exceeds 100, an average value of the number of cracks that exist within any twenty first virtual circles of the first virtual circles included in the non elastic-wave region 39 may be used as a reference.

If the number of the cracks that exist within the first virtual circle 18 is as described above, in the region between the first virtual circles 18, the cracks that pass through the respective first virtual circles 18 tend to be connected to each other. Consequently, an elongated fragment with a length that exceeds 75 mm and/or a large fragment with an area that exceeds 3 $cm^2$ can be prevented from being generated.

In addition, if the reference distance "a" is within the above-described range, and the number of the cracks that exist within the first virtual circle 18 is as described above, the tempered glass plate G can more easily satisfy the fragmentation standard. The reason is that, in the region between the first virtual circles 18, the cracks that pass through the respective first virtual circles 18 can be more easily connected to each other.

Additionally, the tempered glass plate G further includes a second virtual circle that is obtained by connecting the points that are separated from the center of the stress mark 14 by 5 mm; and the average number of the cracks that exist within the second virtual circle is preferably greater than or equal to 8.8, more preferably greater than or equal to 9.1, further more preferably greater then or equal to 9.5, and further more preferably greater than or equal to 10.

The second virtual circle is a circle with a radius of 5 mm; and the second virtual circle is virtually formed on the surface of the enhanced glass plate G.

If the number of the cracks that exist within the second virtual circle is as described above, in the region between the second virtual circles, the cracks that pass through the respective second virtual circles tend to be connected to each other. Consequently, an elongated fragment with a length that exceeds 75 mm and/or a large fragment with an area that exceeds 3 $cm^2$ can be prevented from being generated.

In addition, if the reference distance "a" is within the above-described range, and the number of the cracks that exist within the second virtual circle is as described above, the tempered glass plate G can more easily satisfy the fragmentation standard. The reason is that, in the region between the second virtual circles, the cracks that pass through the respective second virtual circles can be more easily connected to each other.

Additionally, during fracturing of the tempered glass plate G, in the non elastic-wave region 39, an average number of the branching points that exist within the first virtual circle 18 is preferably greater than or equal to 1.5; more preferably greater than or equal to 1.7; and further more preferably greater than or equal to 2.

The branching point represents a point at which two or more cracks intersects; and, in the example illustrated in FIG. 4, there are three branching points.

If the number of the branching points that exist within the first virtual circle 18 is as described above, many cracks with different extending angles are generated around the branching point, so that, in the region between the first virtual circles 18, the cracks that pass through the respective first virtual circles 18 tend to be connected to each other. Consequently, an elongated fragment with a length that exceeds 75 mm and/or a large fragment with an area that exceeds 3 $cm^2$ can be prevented from being generated.

In addition, if the reference distance "a" is within the above-described range, and the number of the branching points that exist within the first virtual circle 18 is as described above, the tempered glass plate G can more easily satisfy the fragmentation standard. The reason is that, in the region between the first virtual circles 18, the cracks that pass through the respective first virtual circles 18 can be more easily connected to each other.

Figure 5:
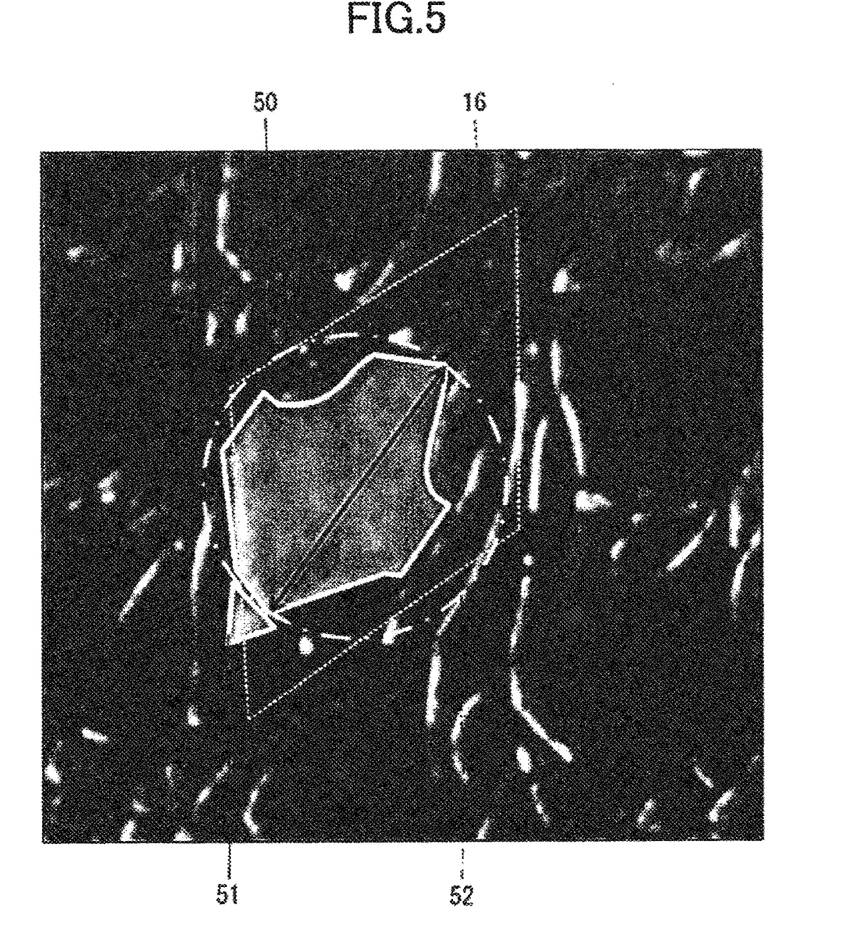
FIG. 5 is a diagram illustrating a largest fragment and a smallest fragment.

FIG. 5 is a diagram illustrating a largest fragment 50 and a smallest fragment 51. During fracturing of the tempered glass plate G, in the non elastic-wave region 39, a ratio between an area of the largest fragment 50, at least a part of which exists within the parallelogram area 16, and an area of the smallest fragment 51, at least a part of which exists within the parallelogram area 16, is preferably greater than or equal to 15; more preferably greater than or equal to 17; further more preferably greater than or equal to 20; further more preferably greater than or equal to 23; and further more preferably greater than or equal to 25.

The largest fragment 50, at least a part of which exists within the parallelogram area 16, refers to one fragment with the largest area of the fragments, at least a part of each of which exists within the parallelogram area 16.

Further, the smallest fragment 51, at least a part of which exists within the parallelogram area 16, refers to one fragment with the smallest area of the fragments, at least a part of each of which exists within the parallelogram area 16.

Furthermore, the long axis b of the parallelogram area 16 is in any direction from the starting point of the crack toward the edge of the tempered glass plate G.

The ratio between the area of the largest fragment 50 and the area of the smallest fragment 51 represents a value obtained by dividing the area of the largest fragment 50 by the area of the smallest fragment 51.

Further, the area of the largest fragment 50 is preferably greater than or equal to 1.5 $cm^2$ and less than or equal to 3.0 $cm^2$; more preferably greater than or equal to 1.8 $cm^2$ and less than or equal to 2.9 $cm^2$; and further more preferably greater than or equal to 2.0 $cm^2$ and less than or equal to 2.8 $cm^2$.

If the largest fragment 50 and the smallest fragment 51 with the above-described ratio are included in at least one parallelogram area 16 within the non elastic-wave region 39, an elongated fragment with a length that exceeds 75 mm and/or a large fragment with an area that exceeds 3 $cm^2$ can be prevented from being generated.

Additionally, it is more preferable that the largest fragment 50 includes the centroid of the parallelogram area 16. By arranging at least one parallelogram area 16 in this manner within the non elastic-wave region 39, an elongated fragment with a length that exceeds 75 mm and/or a large fragment with an area that exceeds 3 $cm^2$ can be prevented from being generated.

Furthermore, for a circle 52 with a diameter that is the largest length of the largest fragment 50, a part of the area of the circle 52 that is occupied by the largest fragment 50 is preferably greater than or equal to 30%; more preferably greater than or equal to 40%; further more preferably greater than or equal to 50%; further more preferably greater than or equal to 55%; and further more preferably greater than or equal to 60%.

As indicated by the double-headed arrow in FIG. 5, for example, the largest length of the largest fragment 50 represents the largest length among lengths of straight lines obtained by connecting two points on the contour line of the largest fragment 50.

The circle 52 with the diameter that is the largest length of the largest fragment 50 represents, for example, the circle 52 that is indicated by a chain line in FIG. 5.

If such a largest fragment 50 is included in at least one parallelogram area 16 within the non elastic-wave region 39, an elongated fragment with a length that exceeds 75 mm and/or a large fragment with an area that exceeds 3 cm$^2$ can be prevented from being generated.

The reason that the ratio between the largest fragment 50 and the smallest fragment 51 is defined as described above, and the reason that the largest fragment 50 is defined as described above are described below by comparing the technical idea of related art with the technical idea of the present application.

In many cases, according to the related art, in order to satisfy the fragmentation standard, a pattern of the plane compressive stress and a pattern of the plane tensile stress are formed in the tempered glass plate, so that the extending directions of the cracks are bent, and that the cracks are connected each other. Furthermore, in the vicinity of the centroid of the parallelogram area, a large fragment tends to be generated. Thus, the extending directions of the cracks are bent, so that the cracks are guided to pass through an area in the vicinity of the centroid of the parallelogram area. Namely, the technical idea of the related art is to cause the tempered glass plate to be fractured into fragments, so that all of the fragments have uniform sizes. However, even with this technical idea, a large fragment tends to be generated within the parallelogram area. The reason is as follows. For a case where the cracks are guided to pass through the area in the vicinity of the centroid of the parallelogram area, cracks that are originally supposed to pass through a portion of the parallelogram area other than the area in the vicinity of the centroid of the parallelogram area are also guided to the area in the vicinity of the centroid, so that a large fragment tends to be generated in the portion of the parallelogram area other than the area in the vicinity of the centroid of the parallelogram area.

In contrast, in the embodiment, it has been found that the fragmentation standard can be easily satisfied, without guiding cracks inside the parallelogram area 16 by a pattern of a plane stress, as long as the reference distance "a" is small, and the number of the cracks is greater than or equal to the above-described number and the number of the branching points is greater than or equal to the above-described number in the vicinity of the center of the stress mark 14, where an internal tensile stress is large. Namely, the technical idea is to cause the largest fragment to be generated in the vicinity of the centroid of the parallelogram area; and the tempered glass plate is fractured into small fragments by connecting cracks in a portion other than the area in the vicinity of the centroid. As described above, since the number of the cracks and the number of the branching points are greater than or equal to predetermined numbers, the density of cracks is high and the cracks tend to be connected in a portion other than the area in the vicinity of the centroid, and the reference distance "a" is small, so that the largest fragment tends not to be a large fragment nor an elongated fragment. Thus, a glass plate can be obtained, which can easily satisfy the fragmentation standard.

An average surface compressive stress of the tempered glass plate G is preferably greater than or equal to 100 MPa and less than or equal to 165 MPa; more preferably greater than or equal to 105 MPa and less than or equal to 160 MPa; and further more preferably greater than or equal to 110 MPa and less than or equal to 155 MPa.

With such a value of the average surface compressive stress, an internal tensile stress can be generated in the entire tempered glass plate G, which is sufficient for causing the cracks to be extended and branched.

Note that, in the tempered glass plate G that is produced by jetting cooling medium from openings of the plurality of nozzles 12 onto the heated glass plate, the surface compressive stress at a point where a jet stream of the cooling medium impinges with the glass plate (the stress mark 14) differs from the surface compressive stress at a point between the stress marks 14. Thus, the average surface compressive stress of the tempered glass plate G is defined to be an average value that is obtained by averaging a value at a point immediately below the nozzle 12 (the first stress mark 14A) and a value at a centroid of a triangle formed by the first stress mark 14A and two points (the second stress mark 14B, and the third stress mark 14C), which are the closest stress marks to the first stress mark 14A, and which are the closest to each other. The former is the point at which the value is expected to be close to the maximum value of the surface compressive stress; and the latter is the point at which the value is expected to be close to the minimum value of the surface compressive stress. The surface compressive stress can be measured by using a Babinet type surface compressive stress meter using scattered light photoelasticity, which is based on a via-scope method.

Furthermore, the value of the surface compressive stress at the stress mark 14 is preferably greater than or equal to 120 MPa and less than or equal to 175 MPa; more preferably greater than or equal to 130 MPa and less than or equal to 175 MPa; further more preferably greater than or equal to 140 MPa and less than or equal to 175 MPa; further more preferably greater than or equal to 143 MPa and less than or equal to 175 MPa; and further more preferably greater than or equal to 145 MPa and less than or equal to 175 MPa.

With such a value of the surface compressive stress at the stress mark 14, an internal tensile stress can be generated at a middle portion in the plate thickness direction corresponding to the position of the stress mark 14, which is sufficient for causing the cracks to be extended and branched, so that, in the vicinity of the center of the stress mark 14, the number of the cracks tends to be greater than or equal to the above-described number, and the number of the branching points tends to be greater than or equal to the above-described number.

Furthermore, a value that is obtained by dividing the value of the surface compressive stress at the stress mark 14 by the value of the surface compressive stress at the centroid of the above-described triangle is preferably greater than or equal to 1.05; more preferably greater than or equal to 1.07; and further more preferably greater than or equal to 1.10. With such a value, the number of the cracks can be caused to be greater than or equal to the above-described number or the number of the branching points can be caused to be greater than or equal to the above-described number, and the largest fragment 50 can be caused to be within the above-described specification, so that an elongated fragment with a length that exceeds 75 mm and/or a large fragment with an area that exceeds 3 cm² can be prevented from being generated.

The type of the glass of the tempered glass plate G according to the embodiment is a soda-lime glass. The soda-lime glass is a glass including, as main components, $SiO_2$, CaO, $Na_2O$, and $K_2O$. Note that the type of the glass of the tempered glass plate G according to the present invention is not particularly limited; and the type of the glass may be an alkali-free glass, or an aluminosilicate glass.

The tempered glass plate G according to the embodiment preferably includes, in terms of an oxide, the following glass composition. With the following glass composition, even if the plate thickness of the glass plate is thin, high surface compressive stress and an internal tensile stress, which is generated while paired with the surface compressive stress, can be generated by the thermally strengthening method. Furthermore, the glass plate can be easily formed to have a complicated shape, such as a complex shaped surface.

Note that a numerical range "x to y" described below is used to imply that the numerical range includes "x" and "y", as the lower limit value and the upper limit value, respectively; and, unless otherwise specified, in the following part of the present specification, "x to y" is used with the same meaning.

First Example $Al_2O_3$: 0 wt. % to 3.5 wt. %
$Na_2O$ and $K_2O$ in total: 12.0 wt. % to 14.5 wt. %

Second Example $Al_2O_3$: 0 wt. % to 2.0 wt. %
$Na_2O$ and $K_2O$ in total: 13.0 wt. % to 15.5 wt. %

The above-described tempered glass plates G according to the first and second examples may include, at least, 65 wt. % to 75 wt. % $SiO_2$, and 7 wt. % to 14 wt. % CaC; and $Al_2O_3$, $Na_2O$, and $K_2O$ in the above-described ranges.

Third Example $SiO_2$: 68.0 wt. % to 75.0 wt. %
$Al_2O_3$: 0 wt. % to 3.5 wt. %
CaO: 7.0 wt. % to 13.0 wt. %
MgO: 0 wt. % to 7.0 wt. %
$Na_2O$: 12.0 wt. % to 15.0 wt. %
$K_2O$: 0 wt. % to 3.0 wt. %
$Na_2O$ and $K_2O$ in total: 12.0 wt. % to 14.5 wt. %

Fourth Example $SiO_2$: 68.0 wt. % to 75.0 wt. %
$Al_2O_3$: 0 wt. % to 2.0 wt. %
CaO: 7.0 wt. % to 13.0 wt. %
MgO: 0 wt. % to 7.0 wt. %
$Na_2O$: 12.0 wt. % to 15.0 wt. %
$K_2O$: 0 wt. % to 3.0 wt. %
$Na_2O$ and $K_2O$ in total: 13.0 wt. % to 15.5 wt. %

$Al_2O_3$ is a component to secure weather resistance, and $Al_2O_3$ is preferably greater than or equal to 1.7 wt. %; and more preferably greater than or equal to 1.8 wt. %. If $Al_2O_3$ exceeds 3.5 wt. %, the viscosity becomes greater, and it may become difficult to melt. In this respect, $Al_2O_3$ is more preferably less than or equal to 3.3 wt. %; and particularly preferably less than or equal to 2.0 wt. %.

$Na_2O$ is a component for enhancing meltability; and if $Na_2O$ is less than 12.0 wt. %, meltability may be lowered. $Na_2O$ is more preferably greater than or equal to 12.8 wt. %; and particularly preferably greater than or equal to 13.0 wt. %. Further, if $Na_2O$ exceeds 15.0 wt. %, the weather resistance may be lowered. $Na_2O$ is more preferably less than or equal to 14.8 wt. %; and particularly preferably less than or equal to 13.8 wt. %.

$K_2O$ is a component for enhancing meltability; and $K_2O$ is preferably greater than or equal to 0.5 wt. %; and more preferably greater than or equal to 0.9 wt. %. Further, if $K_2O$ exceeds 3.0 wt. %, the weather resistance may be lowered, and the cost for the glass plate is increased. $K_2O$ is more preferably less than or equal to 1.8 wt. %; and particularly preferably less than or equal to 1.6 wt. %.

Note that the composition of the glass plate can be measured by the fluorescent X-ray spectroscopy.

Additionally, a coefficient of thermal expansion of the glass plate to be used for producing the tempered glass plate G according to the embodiment is preferably greater than or equal to $90 \times 10^{-7}$/K and less than or equal to $100 \times 10^{-7}$/K; more preferably greater than or equal to $91 \times 10^{-7}$/K and less than or equal to $95 \times 10^{-7}$/K. Note that, in the present specification, the coefficient of thermal expansion represents the average coefficient of thermal expansion from 50° C. to 350° C.

The coefficient of thermal expansion depends on, for example, a β-OH value ($mm^{-1}$), which represents the glass composition and moisture content. For a case of a soda-lime glass, for example, the coefficient of thermal expansion becomes greater, as the content of the alkali metal oxides (such as $Na_2O$ and $K_2O$) in the glass becomes smaller, and as the β-OH value ($mm^{-1}$) becomes smaller.

Furthermore, the β-OH value ($mm^{-1}$) of the glass plate is varied depending on water content in the raw materials, the type of the heat source for melting the raw materials (e.g., heavy oil, LNG, electricity, etc.), water vapor concentration in a dissolver, and resistance time of the molten glass in the dissolver, for example. The β-OH value ($mm^{-1}$) of the glass plate is preferably adjusted, for example, by a method using a hydroxide instead of oxide as the row materials of the glass (e.g., as a magnesium source, magnesium hydroxide ($Mg(OH)_2$) is used, instead of magnesium oxide (MgO)). In the embodiment, the water content in the glass plate, in term of the β-OH value ($mm^{-1}$), is from 0.1 to 0.4; and preferably from 0.2 to 0.3.

With such a coefficient of thermal expansion, even if the plate thickness of the glass plate is thin, high surface compressive stress and an internal tensile stress, which is generated while paired with the surface compressive stress, can be generated by the thermally strengthening method. Furthermore, the glass plate can be easily formed to have a complicated shape, such as a complex shaped surface.

EXAMPLES

Hereinafter, results are described for cases where the tempered glass plates were produced by using the thermally strengthening device 10 illustrated in FIG. 1, and these were fractured.

Example 1

The conditions are described below under which the tempered glass according to example 1 and the tempered glass according to a comparative example were produced.
Plate thickness of the glass plate: 2.3 mm
Coefficient of thermal expansion: $90 \times 10^{-7}$/K
Temperature of the glass prior to quenching: 680° C.

Diameter of the nozzle: 3.4 mm
Distance between the tip of the nozzle and the glass: 15 mm
Reference distance "a" (short axis a): 13.2 mm
Long axis b: 22.9 mm
Wind pressure: 29 kPa
Quenching time: 5 seconds Here, each sample was produced, while setting the oscillating distance during quenching (which is also referred to as the oscillating distance) to be 0 mm, 10 mm, 15 mm, 20 mm, 25 mm, 30 mm, 45 mm, and 60 mm.

The average surface compressive stress at the oscillating distance of 0 mm was 145 MPa. Further, the surface compressive stress value at the stress mark 14 was 152 MPa. Furthermore, the value obtained by dividing the surface compressive stress value at the stress mark 14 by the surface compressive stress value at the centroid of the above-described triangle was 1.11.

Figure 6A:
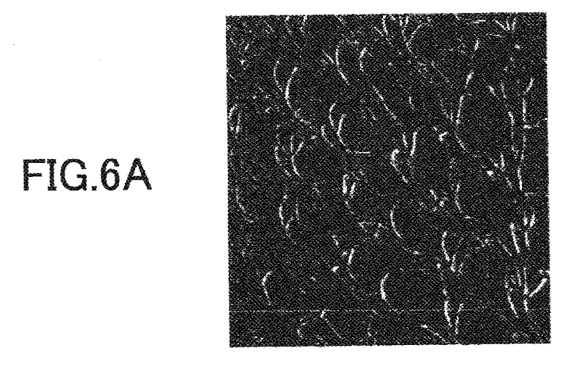
FIGS. 6A, 6B, and 6C are diagrams illustrating a state of a fragment during fracturing.
Figure 6B:
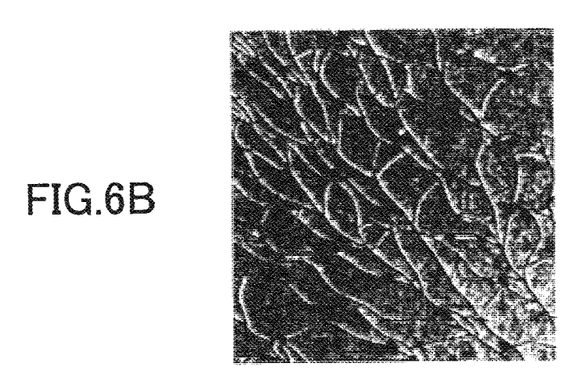
Figure 6C:
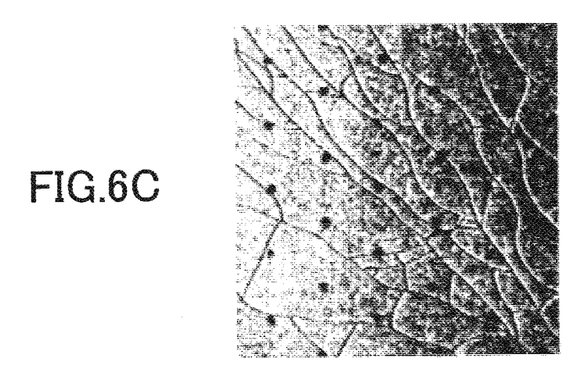
Figure 7:
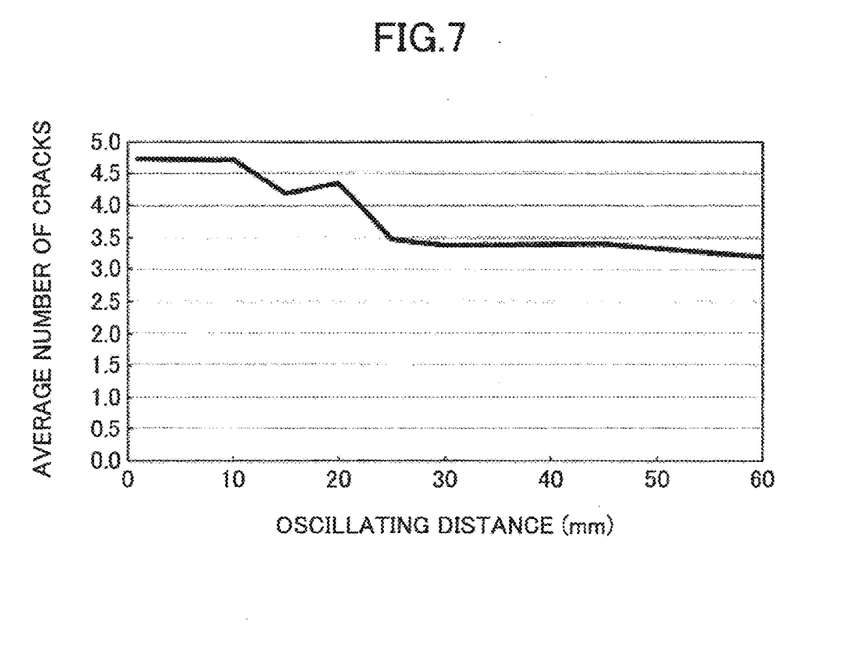
FIG. 7 is a diagram showing a relationship between a oscillating distance and the number of the cracks that exist in the first virtual circle.
Figure 8:
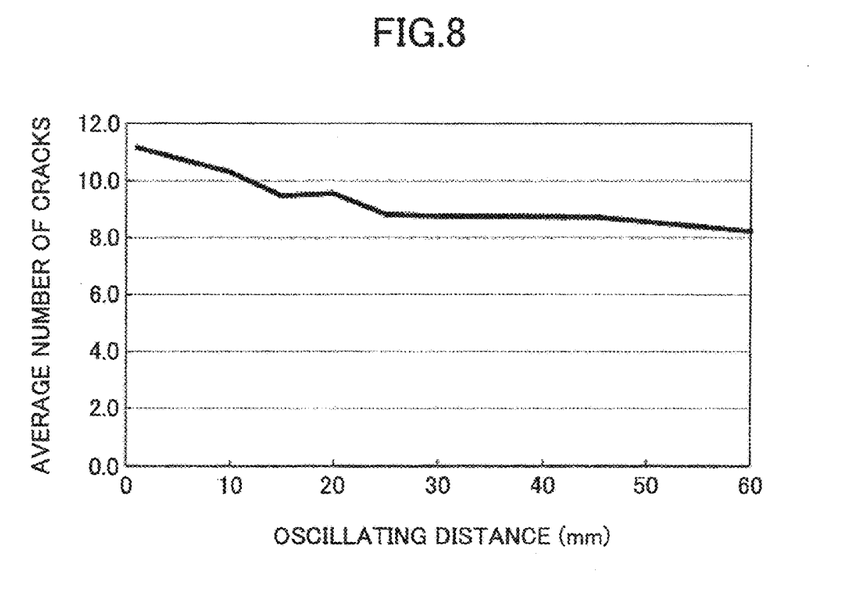
FIG. 8 is a diagram showing a relationship between the oscillating distance and a number of cracks that exist in a second virtual circle.

Each sample generated under the above-described conditions was fractured at the centroid of the sample, as the starting point. FIG. 6A shows a state of the fragments during fracturing for the case where the oscillating distance was 0 mm; FIG. 6B shows a state of the fragments during fracturing for the case where the oscillating distance was 30 mm; and FIG. 6C shows a state of the fragments during fracturing for the case where the oscillating distance was 60 mm. Further, FIG. 7 shows the result of counting, in the non elastic-wave region, the number of cracks in each of the first virtual circles that was obtained by connecting the points that were separated from the corresponding center of the stress mark by 2.5 mm. Similarly, FIG. 8 shows the result of counting the number of cracks in the second virtual circle that was obtained by connecting the points that were separated from the center of the stress mark by 5 mm.

Note that, in FIGS. 6A, 6B, and 6C, points are depicted, as marks indicating the centers of the stress marks.

From FIGS. 6A, 6B, and 6C, it can be seen that, for the case of FIG. 6A, an elongated fragment with a length that exceeds 75 mm and/or a large fragment with an area that exceeds 3 cm$^2$ can be prevented from being generated, compared to the cases of FIGS. 6B and 6C.

From FIG. 7, it can be seen that, if the average number of cracks that exist within the first virtual circle that is formed by connecting the points separated from the center of the stress mark by 2.5 mm is greater than or equal to 3.4, an elongated fragment with a length that exceeds 75 mm and/or a large fragment with an area that exceeds 3 cm$^2$ can be prevented from being generated.

From FIG. 8, it can be seen that, if the average number of cracks that exist within the second virtual circle that is formed by connecting the points separated from the center of the stress mark by 5 mm is greater than or equal to 8.8, an elongated fragment with a length that exceeds 75 mm and/or a large fragment with an area that exceeds 3 cm$^2$ can be prevented from being generated.

Example 2

The conditions are described below under which the tempered glass according to example 2 was produced.
Plate thickness of the glass plate: 2.3 mm
Coefficient of thermal expansion: 90×10$^{-7}$/K
Temperature of the glass prior to quenching: 665° C.
Diameter of the nozzle: 4 mm
Distance between the tip of the nozzle and the glass: 20 mm
Reference distance "a" (short axis a): 18 mm
Long axis b: 31.2 mm
Wind pressure: 22 kPa
Quenching time: 5 seconds
Oscillating distance: 0 mm In example 2, the average surface compressive stress was 117 MPa. Further, the surface compressive stress value at the stress mark 14 was 123 MPa. Furthermore, the value obtained by dividing the surface compressive stress value at the stress mark 14 by the surface compressive stress value at the centroid of the above-described triangle was 1.10.

In example 2, the number of cracks and the number of branching points that exist within the first circle formed by connecting the points separated from the center of the stress mark by 2.5 mm during fracturing, and/or the number of cracks and the number of branching points that exist within the second circle formed by connecting the points separated from the center of the stress mark by 5 mm during fracturing exceed the specified numbers according to this specification, so that an elongated fragment with a length that exceeds 75 mm and/or a large fragment with an area that exceeds 3 cm$^2$ can be also prevented from being generated.

Example 3

The conditions are described below under which the tempered glass according to example 3 was produced.
Plate thickness of the glass plate: 2.3 mm
Coefficient of thermal expansion: 90×10$^{-7}$/K
Temperature of the glass prior to quenching: 680° C.
Diameter of the nozzle: 2.5 mm
Distance between the tip of the nozzle and the glass: 11 mm
Reference distance "a" (short axis a): 9.8 mm
Long axis b: 17 mm
Wind pressure: 28 kPa
Quenching time: 5 seconds
Oscillating distance: 0 mm In example 3, the average surface compressive stress was 139 MPa. Further, the surface compressive stress value at the stress mark 14 was 147 MPa. Furthermore, the value obtained by dividing the surface compressive stress value at the stress mark 14 by the surface compressive stress value at the centroid of the above-described triangle was 1.12.

In example 3, the number of cracks and the number of branching points that exist within the first circle formed by connecting the points separated from the center of the stress mark by 2.5 mm during fracturing, and/or the number of cracks and the number of branching points that exist within the second circle formed by connecting the points separated from the center of the stress mark by 5 mm during fracturing exceed the specified numbers of this specification, so that an elongated fragment with a length that exceeds 75 mm and/or a large fragment with an area that exceeds 3 cm$^2$ can be also prevented from being generated.

What is claimed is:

1. A tempered glass plate that is tempered by cooling medium jetted from a plurality of nozzles,
   wherein a thickness of the tempered glass plate is less than or equal to 2.7 mm,
   wherein on a surface of the tempered glass plate, a plurality of stress marks are formed by the cooling medium jetted from the plurality of nozzles,
   wherein a distance between closest stress marks of the plurality of stress marks is less than or equal to 20 mm,
   wherein the surface of the tempered glass plate includes a first virtual circle that is formed by connecting points that are separated from a center of one of the plurality of stress marks by 2.5 mm, wherein the tempered glass plate includes a non elastic-wave region that is not affected by an elastic-wave that is generated during fracturing, and wherein, during the fracturing, in the non elastic-wave region, an average number of cracks that exist in the first virtual circle is greater than or equal to 3.4.

2. The tempered glass plate according to claim 1, wherein, during the fracturing, in the non elastic-wave region, the average number of the cracks that exist in the first virtual circle is greater than or equal to 4.

3. The tempered glass plate according to claim 1, wherein the surface of the tempered glass plate further includes a second virtual circle that is formed by connecting points that are separated from the center of the one of the plurality of stress marks by 5 mm, wherein, during the fracturing, in the non elastic-wave region, an average number of cracks that exist in the second virtual circle is greater than or equal to 8.8.

4. The tempered glass plate according to claim 3, wherein, during the fracturing, in the non elastic-wave region, the average number of the cracks that exist in the second virtual circle is greater than or equal to 9.5.

5. The tempered glass plate according to claim 1, wherein an average surface compressive stress of the tempered glass plate is greater than or equal to 100 MPa and less than or equal to 165 MPa.

6. The tempered glass plate according to claim 5, wherein the average surface compressive stress of the tempered glass plate is greater than or equal to 105 MPa and less than or equal to 160 MPa.

7. The tempered glass plate according to claim 5, wherein the average surface compressive stress of the tempered glass plate is greater than or equal to 110 MPa and less than or equal to 155 MPa.

8. The tempered glass plate according to claim 1, wherein a surface compressive stress value at the one of the plurality of stress marks is greater than or equal to 120 MPa and less than or equal to 175 MPa.

9. The tempered glass plate according to claim 8, wherein the surface compressive stress value at the one of the plurality of stress marks is greater than or equal to 130 MPa and less than or equal to 175 MPa.

10. The tempered glass plate according to claim 8, wherein the surface compressive stress value at the one of the plurality of stress marks is greater than or equal to 140 MPa and less than or equal to 175 MPa.

11. The tempered glass plate according to claim 8, wherein the surface compressive stress value at the one of the plurality of stress marks is greater than or equal to 143 MPa and less than or equal to 175 MPa.

12. The tempered glass plate according to claim 8, wherein the surface compressive stress value at the one of the plurality of stress marks is greater than or equal to 145 MPa and less than or equal to 175 MPa.

13. The tempered glass plate according to claim 1, wherein the plurality of stress marks includes a first stress mark, wherein the plurality of stress marks further includes a second stress mark and a third stress mark, the second stress mark and the third stress mark being closest to the first stress mark, and the second stress mark and the third stress mark being closest to each other, wherein the tempered glass plate includes a triangle that is formed by the first stress mark, the second stress mark, and the third stress mark, and wherein a value obtained by dividing a value of a surface compressive stress at the first stress mark by a surface compressive stress at a centroid of the triangle is greater than or equal to 1.05.

14. The tempered glass plate according to claim 13, wherein the value obtained by dividing the value of the surface compressive stress at the first stress mark by the surface compressive stress at the centroid of the triangle is greater than or equal to 1.07.

15. The tempered glass plate according to claim 13, wherein value obtained by dividing the value of the surface compressive stress at the first stress mark by the surface compressive stress at the centroid of the triangle is greater than or equal to 1.10.

16. The tempered glass plate according to claim 1, wherein the plurality of stress marks includes a first stress mark, wherein the plurality of stress marks further includes a second stress mark, a third stress mark, and a fourth stress mark, wherein the second stress mark, the third stress mark, and the fourth stress mark are closest to the first stress mark, wherein the tempered glass plate forms a parallelogram area by the first stress mark, the second stress mark, the third stress mark, and the fourth stress mark, and wherein the parallelogram area is included in the non elastic-wave region that is not affected by the elastic-wave during the fracturing, wherein a long axis of the parallelogram area is in any direction from a starting point of a crack toward an edge of the tempered glass plate, and wherein a ratio between an area of a largest fragment, at least a part of the largest fragment being in the parallelogram area, and an area of a smallest fragment, at least a part of the smallest fragment being in the parallelogram area, is greater than or equal to 15.

17. The tempered glass plate according to claim 16, wherein the area of the largest fragment is greater than or equal to 1.5 cm$^2$ and less than or equal to 3.0 cm$^2$.

18. The tempered glass plate according to claim 16, wherein the largest fragment includes a centroid of the parallelogram area.

19. The tempered glass plate according to claim 16, wherein, in a circle with a diameter that is a largest length of the largest fragment, a part of an area of the circle that is occupied by the largest fragment is greater than or equal to 30%.

20. The tempered glass plate according to claim 1, wherein a thickness of the tempered glass plate is greater than or equal to 1.8 mm and less than or equal to 2.5 mm.

21. The tempered glass plate according to claim 1, wherein an average coefficient of thermal expansion of the tempered glass plate from 50° C. to 350° C. is greater than or equal to $90 \times 10^{-7}$/K and less than or equal to $100 \times 10^{-7}$/K.

22. The tempered glass place according to claim 1, wherein a distance between closest stress marks of the plurality of stress marks is less than or equal to 16 mm.

23. The tempered glass place according to claim 1, wherein a distance between closest stress marks of the plurality of stress marks is less than or equal to 14 mm.

24. The tempered glass place according to claim 1, wherein a distance between closest stress marks of the plurality of stress marks is less than or equal to 12 mm.

25. The tempered glass place according to claim 1, wherein a distance between closest stress marks of the plurality of stress marks is less than or equal to 10 mm.

26. The tempered glass place according to claim 1, wherein the stress marks are formed at positions intersecting lines extended from the plurality of nozzles.

27. The tempered glass plate according to claim 1, wherein the cracks in the first virtual circles are connected to each other.

28. The tempered glass plate according to claim 1, wherein, during fracturing, an average number of the branching points that exist within the first virtual circle is greater than or equal to 1.5.

29. The tempered glass plate according to claim 1, wherein, during fracturing, an average number of the branching points that exist within the first virtual circle is greater than or equal to 1.7.

30. The tempered glass plate according to claim 1, wherein, during fracturing, an average number of the branching points that exist within the first virtual circle is greater than or equal to 2.

* * * * *